3,468,851
LINEAR POLYAMIDE AND OXAZINONE-CONTAINING POLYMER AND METHOD OF PRODUCING THE SAME
Naoya Yoda, Ryoji Nakanishi, Takashi Kubota, Masaru Kurihara, and Kojyuro Ikeda, Kamakura-shi, Japan, assignors to Toyo Rayon Kabushiki Kaisha, Tokyo, Japan, a corporation of Japan
No Drawing. Filed June 14, 1965, Ser. No. 463,855
Claims priority, application Japan, June 16, 1964, 39/33,750; Sept. 22, 1964, 39/53,837; Oct. 19, 1964, 39/59,102; Feb. 26, 1965, 40/10,780
Int. Cl. C08g 20/20, 20/32, 33/02
U.S. Cl. 260—78                                           12 Claims

ABSTRACT OF THE DISCLOSURE

A linear polyamide of the formula

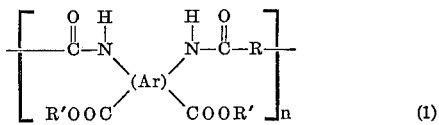

is obtained by solution polycondensation of diaminodicarboxylic acids with dicarboxylic acid halides. Intramolecular cyclization of said linear polyamide by heat-treatment yields an oxazinone-containing polymer of the formula

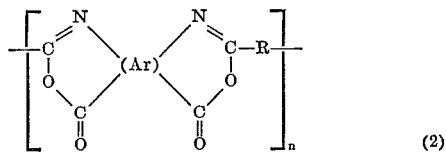

In said Formulae 1 and 2, (Ar) is a tetravalent aromatic radical having at least 6 carbon atoms, R is a divalent radical, R' is a monovalent radical selected from the group consisting of hydrogen, alkyl radicals of 1 to 6 carbon atoms and phenyl group, and $n$ is an integer sufficiently great enough that the inherent viscosity measured in 0.5% solution of the polymer in concentrated sulfuric acid at 30° C. becomes at least 0.1.

---

This invention relates to new linear polyamide polymers and polybenzoxazinones obtainable therefrom. More particularly, the invention relates to linear polymers and polybenzoxazinones which can be readily worked up into articles of optional forms, which is then heat-treated to effect thermal dehydration and converted into the new polybenzoxazinone having excellent thermal stabilities.

Those polymers having the recurring units consisting of the heterocyclic ring fused with the benzene ring, owing to their noteworthy chemical and physical properties such as superior stability against heat, have been attracting attention not only when used for articles having specific forms such as films, filaments, enamel coatings or pipes but also as adhesives.

These polymers however were lacking in practical value because they had one of the following shortcomings, such as that, in general, it was difficult to obtain polymers of high degree of polymerization from them, that their workability was extremely poor because the polymer formed was insoluble as well as unmeltable, and that since their melting point was ca. 300° C., their heat resistance was not sufficient. In addition, the starting materials, i.e. the monomers, used in the preparation of these polymers were generally expensive in most cases to lessen further their practicality.

An object of the present invention is to provide a new polymer which does not possess the foregoing shortcomings.

Another object of the invention is to provide new high molecular weight linear polyamide polymers having excellent processability.

A still another object of this invention is to provide new high molecular weight polybenzoxazinones having excellent thermal stabilities, which are derived from the foregoing linear polyamide polymers.

A further object of the invention is to provide a method of preparing the foregoing linear polyamide polymers from starting materials, i.e. monomers, which are generally available at comparatively low cost.

A still further object of the invention is to provide a method wherein the foregoing linear polyamide polymers are changed into a desired form and then the polymers in this form are converted to polybenzoxazinones.

Other objects and advantages of the present invention will be apparent from the following description.

The hereinabove given objects are attained by means of the linear polyamide polymers of the invention having the following formula

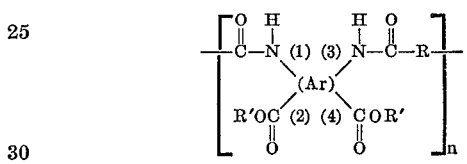

wherein (Ar) is a tetravalent aromatic radical having at least 6 carbon atoms, R is a divalent radical, R' is a monovalent radical selected from the group consisting of hydrogen, alkyl radicals of from 1 to 6 carbon atoms and a phenyl radical, the bonds (1) and (2), similarly as with bonds (3) and (4), each being directly bonded to the carbon atoms adjoining each other on the aromatic radical, and $n$ is an integer sufficiently great enough that the inherent viscosity measured in 0.5% solution of the polymer in concentrated sulfuric acid at 30° C. becomes at least 0.1.

Further, preferably (Ar) is an aromatic radical having 6 to 15 carbon atoms; R, a divalent radical directly connecting the two carbonyl groups, an arylene radical or an alkylene radical of 1 to not more than 10 carbon atoms, an arylene radical of 6 to 15 carbon atoms being particularly to be preferred; and $n$, an integer sufficiently great enough that the inherent viscosity ($\eta_{inh}$) measured in 0.5% solution of the polymer in concentrated sulfuric acid at 30° C. becomes at least 0.1 and preferably from 0.3 to 5.0.

Further, it is preferred that the foregoing aromatic radical (Ar) has the formula

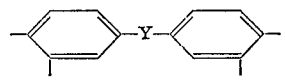

wherein Y is a divalent radical selected from the group consisting of a carbon-carbon bond directly connecting the benzene rings,

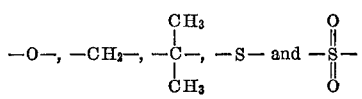

The present method of preparing the aforementioned polyamide comprises reacting at a temperature not exceeding 200° C., at least one aromatic diamino dicarboxylic acid component having the formula

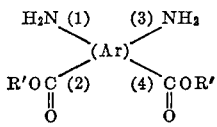

wherein (Ar) is an aromatic radical having at least 6 carbon atoms and R' is a monovalent radical selected from the group consisting of hydrogen, an alkyl radical of from 1 to 6 carbon atoms and a phenyl radical, the bonds (1) and (2), similarly as with bonds (3) and (4), being directly bonded to the carbon atoms adjoining each other on the aromatic radical; with at least one dicarboxylic acid component of the formula

X—R—X where R is a divalent radical and X is a monovalent functional radical which can form a carboamide by reacting with the amino radical of the foregoing aromatic diamino dicarboxylic acid component.

The aromatic diamino dicarboxylic acid component which is suitably used in the invention method includes those of the following formulas:

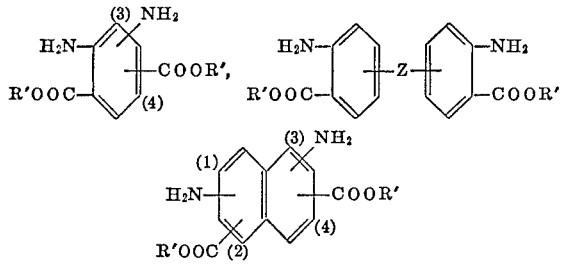

wherein R' and the bonds (1) and (2) as well as (3) and (4) have the foregoing meanings, and Z is a divalent radical, such as a carbon-carbon bond directly connecting the benzene rings,

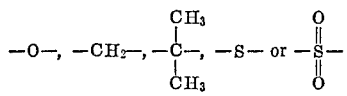

Examples of these compounds include:

3,3'-benzidine dicarboxylic acid and the methyl and ethyl esters there of,
2,5-diamino terephthalic acid,
4,6-diamino isophthalic acid,
diphenyl 2,7-diamino-3,6-naphthaline dicarboxylate,
bis(3-amino-4-carboxyphenyl)ether, and
2,2-bis(3-amino-4-carboxyphenyl)propane.

The amino radicals in these compounds need not be in their free state, it being possible to use the compounds with the amino radicals in their salt state. The salt with hydrochloric acid is particularly usable conveniently, as its solubility in solvents is good.

The compounds conveniently usable as the dicarboxylic acid component in the invention method have the following formulas:

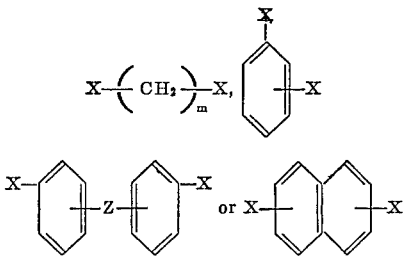

wherein $m$ is an integer from 0 to 10, and X and Z have the meanings as defined hereinbefore. The monovalent functional radical X, which can form a carboamide by reacting with the amino radical of the aromatic diamino dicarboxylic acid component, is preferably a

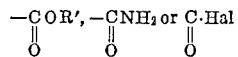

radical, where R' is hydrogen, an alkyl radical of form 1 to 6 carbon atoms or a phenyl radical, and Hal is a halogen atom such as chlorine and bromine.

Typical examples of these compounds include terephthalic acid, ethyl terephthalate, terephthaloyl chloride, terephthalamide, isophthalic acid, isophthaloyl chloride, 3,4-dimethyl isophthaloyl chloride, 1,5-naphthalene dicarboxylic acid, 1,5-naphthalene dicarbonyl chloride, 4,4'-biphenyl carboxylic acid, 4,4'-diphenylmethane dicarboxylic acid, bis(4 - chlorocarboxylphenyl)methane, 2,2 - bis(4-carbamoylphenyl)propane, 2,2-bis(4 - chlorcarbonylphenyl)propane, bis(4 - chlorocarboxyphenyl)ether, oxalic acid, adipic acid, adipic acid chloride, adipamide, and ethyl adipate.

Although it is preferred in carrying out the reaction that these reaction components are supplied finally in nearly equimolar quantities, it is also possible to feed one or the other of the components in excess. In preparing the invention polyamide, the polymerization reaction between these two components must be carried out at a temperature not exceeding 200° C.

Generally speaking, this polymerization reaction is preferably carried out in a liquid medium. As this organic solvent, one is used in which the reactivity between its functional group and either one of the reactants is lesser than that between the two reactants. This organic solvent should be one which not only is inert to the reaction system and preferably a solvent of the product but is also a solvent of either one of the two reactants, and preferably both thereof. As such a solvent, conveniently used are the normally liquid compounds belonging to the N,N-dialkyl carboxylic acid amide group. The solvents belonging to this group include such as N,N-dimethylformamide, N,N-dimethylacetamide, N,N-dimethyl methoxyacetamide and N-methyl caprolactam. Besides these, the organic solvents such as, e.g., dimethyl sulfoxide, N-methylpyrrolidone, dimethyl sulfone, hexamethyl phosphortriamide, tetramethylene sulfone, formamide, N-methylformamide and N-acetylpyrrolidone can be mentioned as being suitable. These solvents are either used singly or in combination between themselves, or in combination with other suitable solvents such as, e.g., benzene, benzonitrile, dioxane, xylene, toluene and cyclohexane. It is preferable that the amount of such organic solvent is within such range that the concentration of a polymer to be produced may be 0.05–40% by weight.

When an alkali metal salt or an alkaline earth metal salt is dissolved in the system in carrying out the polymerization reaction using an organic liquid as the liquid medium, in general, the system is maintained in a stable state and the obtaining of polymers of high degree of polymerization is made easier. Preferred in this case as the salts of the alkali or alkaline earth metals is the use of the halides of such metals, such as lithium chloride, lithium bromide, magnesium bromide, magnesium chloride, beryllium chloride and potassium chloride. These salts are preferably used in amount of 0.01–50% by weight, and particularly 0.2–5% by weight, based on the organic solvent. The effect of these salts is likewise manifested in the case of the polymerization reaction wherein is used as the liquid medium the hereinafter mentioned polyphosphoric acid. Further, when a dicarbonyl halide is used as the dicarboxylic acid component, the presence of an organic base such as pyridine, quinoline and dimethylaniline frequently brings about more desirable results as an acid accepter, similarly as in the preparation of the conventional polyamides.

The foregoing polymerization method wherein an organic solvent is used as the liquid medium is preferably carried out when a compound in which X is a

radical is used as the dicarboxylic acid component, and a reaction temperature is −30–100° C., and particularly 0–100° C.

The interfacial polycondensation which is known as a modification of the polymerization method of using an organic solvent can also be utilized. Namely, this method comprises effecting a polymerization reaction at the interface between a water-immiscible organic solvent in which has been dissolved a dicarbonyl chloride and an aqueous solution of a diamino dicarboxylic acid component containing an acid accepter. In this case, carbon tetrachloride, benzene, toluene, cyclohexane and chloroform are suitably used as the organic solvent. On the other hand, a caustic alkali is preferably used as the acid accepter. In such an interfacial polycondensation reaction, the use of a temperature circa room temperature is preferred.

Alternatively, polyphosphoric acid can also be used as the liquid medium of the polycondensation reaction. Preferred as such polyphosphoric acid is one whose phosphorous pentoxide content is 80–90%, and preferably 84–86%. When using polyphosphoric acid, the dicarboxylic acid component need not necessarily possess the aforesaid functional group when this component is being added, but it may be, say, the corresponding dinitrile. The reason is because these dinitriles become a free dicarboxylic acid by means of the action of the polyphosphoric acid, and this acid then participates in the polymerization reaction. These dinitriles include, e.g., terephthalonitrile, adiponitrile, 4,4'-di(cyano)diphenyl methane, 4,4'-cyanobiphenyl and 4,6-dimethylisophthalonitrile. The polycondensation reaction in which polyphosphoric acid is used as the medium is suitably carried out at a temperature of 120° to 200° C.

Also the polymerization reaction can be carried out in the absence of such liquid medium, namely, by so-called bulk polymerization.

It should be understood that the polymer obtained by such process of this invention, namely, the polyamide of this invention need not consist of complete polyamide only. In other words, the produced polymer at least 50% by weight of which is polyamide will do, and the remaining part may be dried to polybenzoxazinone. Because, when at least 50% by weight of the polymer is polyamide, the characteristics essentially as polyamide will come out.

The invention polyamides obtained as described hereinbefore contain, in their as-obtained state, some low polymers. Thus, from the standpoint of improving the properties of the resultant polymers, it is effective to treat them with an aqueous solution of caustic alkali on the order of 0.5–10% to remove this low polymer portion.

By utilizing its solubility in organic solvents, the polyamide of high degree of polymerization, as obtained by the present invention, can be made into filaments or fibers by means of the conventional dry and wet-spinning methods. Or it can be made into such shaped articles as films, sheets, rings and pipes by casting. Again, the invention polyamide as a solution can also be applied as a coating composition.

Since, as hereinabove noted, the invention polyamides are in solution form and are generally used as an organic solvent solution, it is necessary that this solution be maintained in a stable state. The organic solvent solution of the invention polyamides is, in general, unstable and there is a tendency to an increase in its viscosity with the passage of time. For preventing such an increase in viscosity, it is preferred to add to the polyamide solution as stabilizers aliphatic carboxylic acids of from 1 to 3 carbon atoms, benzene aldehydes or phenols. Such stabilizers include benzaldehyde, p-nitrobenzaldehyde, formic acid, monochloroacetic acid, naphthol, p-aminophenol and phenol.

After the foregoing invention polyamides have been shaped into various forms or have been applied to other articles, they are finally converted to polybenzoxazinones.

The new polybenzoxazinones of the present invention are polymers containing an oxazinone ring having the following formula:

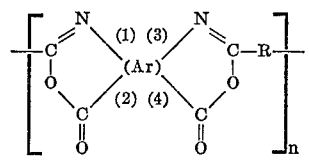

wherein (Ar) is a tetravalent aromatic radical having at least 6 carbon atoms, R is a divalent radical, the bonds (1) and (2), similarly as with bonds (3) and (4), each being directly bonded to carbon atoms adjoining each other on the aromatic radical and $n$ is an integer sufficiently great enough that the inherent viscosity measured in 0.5% solution of the polymer in concentrated sulfuric acid at 30° C. becomes at least 0.1.

Further, the tetravalent aromatic radical and the divalent radical R are preferably such radicals as described in connection with the polyamide. Of great importance to the invention polybenzoxazinones and the polyamides, the polymer prior to the intramolecular condensation, is that they should be of sufficiently high molecular weight such that their inherent viscosity ($\eta_{inh}$) is at least 0.1, and still more preferably from 0.3 to 5.0. This $\eta_{inh}$ can obtained by preparing a 0.5% solution of the polybenzoxazinone by dissolving it in concentrated sulfuric acid and measuring this at 30° C.

The method of obtaining the invention polybenzoxazinones from the linear polyamides having the formula

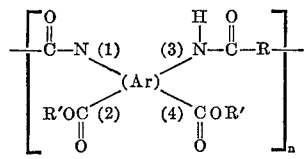

consists in effecting the intramolecular cyclization reaction by elimination of the R'OH molecule from the linear polyamides. The substance to be eliminated from the polyamides in this case is either water, alcohol or phenol. This cyclizing reaction can be carried out either by heating the polyamides, which have been changed to optional physical forms, to at least 200° C., and preferably 250–400° C., or by treating the polyamides with a dehydrating agent. In the case the former method consisting of accomplishing the cyclizing reaction by means of heat is adopted, it is preferred from the standpoint of the properties obtained in the final polymers to carry out the heating of the polyamides under a reduced pressure of below 10 mm. Hg or in a non-oxidizing atmosphere such as nitrogen, argon or carbon dioxide. Next, in case of the cyclization method by means of the treatment with a dehydrating agent, the treatment with a substantially anhydrous basic organic soluion containing a carboxylic acid anhydride is convenient. The molecule eliminated in this case as the R'OH is, needless to say, water. Hence, this cyclization method is restricted to the instance where the R' radical of the polyamides is hydrogen. The carboxylic acid anhydrides here used include the anhydrides of the following aliphatic and aromatic carboxylic acids: e.g., the simple or mixed anhydrides of acetic acid, propionic acid, butyric acid, valeric acid, benzoic acid, toluic acid, ethylbenzoic acid, propylbenzoic acid, anisic acid, nitrobenzoic acid, halo-benzoic acid, and dimethyl benzoic acid. As long as the amount used of the carboxylic acid anhydrides is at least the stoichiometric quantity, based on the aromatic diamino dicarboxylic acid component in the polyamide, there are not particular restrictions. However, usually a great excess is used. While there is no particular restriction as to the basic substance which make up the basic organic solution containing the carboxylic acid anhydride, so long as it is one which can maintain the system basic, normally the amines such as pyridine, quinoline, iso-quinoline, lutidine, methyl pyridine, isopropyl pyridine, N-methyl morpholine, trimethylamine, and triethylamine and the metal alkoxides such as sodium butoxide are conveniently used. This basic substance is preferably used in an amount sufficient to remain in the system up until the completion of the dehydrate reaction, the normal use being in a range of 0.0–1 molar equivalent, based on the carboxylic acid anhydride.

Although it will suffice that the basic organic solvent containing the carboxylic acid anhydride is a liquid at the time of its use, it is usually preferred that it is one which is liquid at room temperature. For this purpose, the inert organic solvents such as benzene, toluene, xylene, heptane, hexane, octane, cyclohexane and tetrahydrofuran, are, as required, used either as agents to effect the solution of the basic organic solution or as diluents thereof. The treatment time will vary depending upon the class of solution used and the form of the polyamide, but normally a time on the order of from 30 minutes to 24 hours is employed. Although a treatment temperature in the neighborhood of room temperature is sufficient, a higher temperature than this is also permissible, of course. When the so obtained polybenzoxazinone is then heated and dried at 20–150° C., and preferably 70–120° C., at normal or reduced pressure, its stability is improved still further.

The final polymer of the present invention, which has been obtained as hereinbefore described, may be one which is composed of the polybenzoxazinone alone, or may be a mixture of the polybenzoxazinone with other polymers or inert modifiers. The invention polybenzoxazinones, owing to their high degree of polymerization, not only possess superior physical properties at room temperature but also, in general, maintain their superior mechanical properties as well as chemical resistance over prolonged periods at even elevated temperatures of, say 500° C. Thus, the great variety of shaped articles, e.g., fibers, filaments, autonomous films, sheets, plates, pipes and rings, which have been formed from the invention polyamides and moreover then have been converted into polybenzoxazinones having a high degree of heat resistance, maintain their superior mechanical and chemical properties at room temperature as well as at elevated temperatures. In addition, the coating composition containing the invention polyamides as a solution, when applied as a coating to other articles and then converted to polybenzoxazinones, can impart heat resistance to these other articles. Further, by adding a suitable foaming agent to an invention polyamide and then decomposing this foaming agent and at the same time eliminating the R'OH from the polymer to effect its cyclization, a polybenzoxazinone in the form of a sponge or a foamed product can be obtained.

For illustrating the invention further, the following examples are given, it being understood that these examples are intended in an illustrative sense and not in limitation of the invention. Unless otherwise noted, all parts and percentages are on a weight basis.

EXAMPLE 1

136 parts of 3,3'-benzidine dicarboxylic acid, and 21 parts of lithium chloride are charged to a polymerization vessel completely purged with nitrogen. 200 parts of dimethylformamide are added to the foregoing mixture followed by addition of 10 parts of pyridine, after which 101 parts of terephthaloyl chloride were added and the mixture is cooled to −5–10° C. The temperature was than raised up to room temperature, and the reaction was carried out for 10 hours. The reaction product was added to 300 parts of methanol, and the precipitate was separated by filtration. The polymer, which was obtained as a yellowish brown powder, was soluble in dimethyl sulfoxide and dimethylacetamide. It was also partly soluble in dimethylformamide and trifluoroacetic acid. It was confirmed by elemental analysis and infrared spectrum that this polymer was a linear polymer having the following Formula I.

(I) 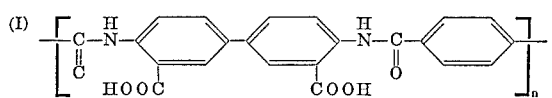

The inherent viscosity $\eta_{inh}$ of this polymer measured in a 0.5% solution thereof in concentrated sulfuric acid solution at 30° C. was 0.52.

By heating this polymer I in a rotary evaporator for 5 hours at 230° C. and a reduced pressure of 1 mm. Hg, a polymer having a benxozazinone ring was obtained. The melting point of this polymer was above 900° C. It was confirmed by means of elemental analysis and infrared spectrum that this polymer had the formula given below. The inherent viscosity $\eta_{inh}$ in concentrated sulfuric acid (0.5% concentration and 30° C.) was 1.65. Further, the molecular weight of the final polymer, as obtained from the Mark-Houwink Relations was about 48,000.

(II) 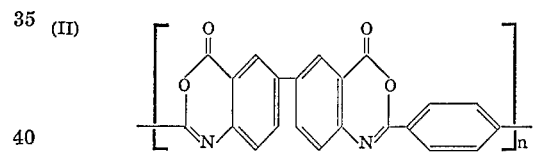

EXAMPLE 2

272 parts of 3,3'-benzidine dicarboxylic acid (melting point 300° C.) was dissolved in 300 parts of hexamethyl phosphortriamide. This solution was gradually poured into a solution cooled to −5° C. in a polymerization vessel, the latter solution consisting of 116 parts of isophthaloyl chloride dissolved in 200 parts of cyclohexanone, to which have also been added 10 parts of pyridine, the addition being carried out with stirring at atmospheric pressure in a stream of nitrogen. The addition was completed in about 40 minutes, after which the polymerization reaction was carried out for 6 hours at 50–60° C. The resulting polymer was precipitated in methanol and separated by filtration. The polymer was then heated in a stream of nitrogen for 1 hour at 250–280° C. and a reduced pressure of 2–3 mm. Hg. to completely condense the reactants and yield a crystalline polymer having a melting point of about 400° C. In the infrared spectrum, the N—H stretching vibration of primary amino group completely disappeared, and the new carbonyl absorption at 1760 cm.$^{-1}$ of the benzoxazinone ring was confirmed.

The polymer melted at above 900° C. and a gradual decrease of the weight loss of 10% was observed at 800° C. The inherent viscosity $\eta_{inh}$ as measured in dimethylacetamide at 25° C. was 0.96.

EXAMPLES 3–8

The various aromatic diamino dicarboxylic acid components shown in Table I, below, were dissolved in solvent A, while the various dicarboxylic acid halogenides were dissolved in solvent B. Then both were polycondensed under the conditions indicated in said Table I, and linear polyamide polymers were obtained.

TABLE I

| Example | Diamino dicarboxylic acid component/parts | Dicarboxylic acid halogenide/parts | Catalyst/parts | Solvent/parts | Temperature, °C./time, hrs. | Resulting Polymer Yield, percent | Viscosity [η inh.] |
|---|---|---|---|---|---|---|---|
| 3 | 2,5-diamino terephthalic acid/19.6 | 3,4-dimethylisophthaloyl chloride/23.1 | Pyridine/20 | (A) dimethyl sulfoxide/600 (B) hexane/600 | 180–185/5 | 85 | 1.46 |
| 4 | 4,6-diamino isophthalic acid/19.6 | 4,4'-bis(chlorocarbonyl) diphenyl methane/29.1 | Triethylamine/24 | (A) dimethylacetamide/600 (B) cyclohexane/600 | 165/10 | 48 | 1.38 |
| 5 | 3,3'-benzidine dicarboxylic acid/28.6 | 4,4'-bis(chlorocarbonyl) biphenyl/27.9 | Lithium chloride/2.0 | (A) dimethylformamide/160 (B) cyclohexane/160 | 160/10 | 65 | 1.45 |
| 6 | Diethyl 3,3'-benzidine dicarboxylate/32.8 | 1,5-naphthalene dicarbonyl chloride/25.3 | Triethylamine/20 | (A) dimethylacetamide/100 (B) hexane/100 | 163/10 | 80 | 1.59 |
| 7 | Diphenyl 2,7-diamino-3,6-naphthalene dicarboxylate/40 | Terephthaloyl bromide/21.2 | Pyridine/20 | (A) dimethylformamide/200 (B) cyclohexane/200 | 160/10 | 75 | 1.56 |
| 8 | 4,6-diamino isophthalic acid/19.6 | Adipic acid dichloride/18.3 | Lithium chloride/2.4 | (A) methylacetamide/600 (B) heptane/600 | 165/10 | 65 | 1.48 |

EXAMPLE 9

1.36 parts of 3,3'-benzidine dicarboxylic acid [melting point 300° C. (decomposition)] were ground finely. A polymerization flask replaced with nitrogen was filled with 44 parts of polyphosphoric acid, then after raising the temperature to 80° C., 1.1 parts of terephthaloyl chloride were added to the flask, after which 1.36 parts of 3,3'-benzidine dicarboxylic acid were also added gradually. The temperature was gradually raised and the reaction was carried out at normal atmospheric pressure in a stream of nitrogen for 1 hour at 140° C. and then for another 1 hour at 150–160° C. The reaction liquid gradually became a yellowish brown, viscous liquid. The reactants were completely polymerized and the yield obtained was as estimated. The polymer obtained was a yellowish brown powder had a decomposition melting point at above 900° C. (as obtained by the Leitz polarizing microscope). It was confirmed by means of the infrared spectrum that a linear polyamide had been formed. A tough film was formed from a dimethyl sulfoxide solution of this polymer. When this film was heated for 3 hours at 300° C./1 mm. Hg in a stream of nitrogen, it was converted into a heat-resistant film composed completely of a polybenzoxazinone.

EXAMPLES 10–16

The procedures described in Example 9 were followed and polymers composed predominantly of linear polyamides were prepared by carrying out the reactions between the diamino dicarboxylic acid components and the dicarboxylic acid halogenides given in Table II, below, under the conditions given therein.

TABLE II

| Example | Diamino dicarboxylic acid component/parts | Dicarboxylic acid halogenide/parts | Inorganic acid/parts | Polymerization temperature, °C./time, hrs. | Yield, percent | Resulting Polymer η inh. 30° C., 0.5% H₂SO₄ | Melting point, °C. |
|---|---|---|---|---|---|---|---|
| 10 | 2,5-diamino terephthalic acid/19.6 | 3,4-dimethyl isophthaloyl chloride/23.1 | Polyphosphoric acid/600 | 175/5 | 80 | 1.18 | Above 500. |
| 11 | 4,6-diamino isophthalic acid/19.6 | 4,4'-bis(chlorocarbonyl) diphenyl methane/29.1 | Fuming sulfuric acid/600 | 150/5 | 75 | 1.45 | Do. |
| 12 | 3,3'-benzidine dicarboxylic acid/28.6 | 4,4'-bis(chlorocarbonyl) biphenyl/27.9 | Polyphosphoric acid/700 | 175/5 | 88.6 | 1.60 | Do. |
| 13 | Diethyl 3,3'-benzidine dicarboxylate/32.8 | 1,5-naphthalene dicarbonyl chloride/25.3 | Polyphosphoric acid/460 | 165/5 | 85 | 1.96 | Do. |
| 14 | Diphenyl 2,7-diamino-3,6-naphthalene dicarboxylate/40.0 | Terephthaloyl bromide/21.2 | Polyphosphoric acid/440 | 160/5 | 80 | 1.02 | Do. |
| 15 | 3,3'-benzidine dicarboxylic acid/13.6 | Isophthaloyl chloride/10.1 | do | 160/5 | 85 | 1.06 | Above 540. |
| 16 | 4,6-diamino isophthalic acid/19.6 | Adipic acid dichloride/18.3 | Phosphorus pentoxide/600 | 160/5 | 85 | 1.56 | Above 350. |

EXAMPLE 17

1.36 parts of 3,3'-benzidine dicarboxylic acid [melting point 300° C. (decomposition)] were ground finely. A polymerization flask replaced with nitrogen was filled with 44 parts of polyphosphoric acid, then after raising the temperature to 80° C., 0.9 part of terephthalic acid was added to the flask, after which 1.36 parts of the 3,3'-benzidine dicarboxylic acid were also added gradually. The temperature was gradually raised and reaction was carried out for 1 hour at 140° C. and then for another 1 hour at 150–160° C. The reaction liquid gradually became a yellowish brown, viscous liquid. The reactants were completely polymerized and the yield obtained was as estimated. The polymer obtained as a yellowish brown powder had a weight loss of 5.0% at 600° C. (thermal gravometric analysis). It was confirmed by means of the infrared spectrum that a linear polyamide had been formed. A tough, transparent, yellow film could be formed from a dimethyl sulfoxide solution of this polymer. By heating this film for 3 hours at 300° C./1 mm. Hg in a stream of nitrogen, it was converted into a heat-resistant film composed completely of a polybenzoxazinone. The inherent viscosity η_inh of this polymer measured in a 0.5% solution thereof in concentrated sulfuric acid at 30° C. was 1.85. As a result of a heat stability test by means of a thermobalance, the rate of weight decrease of this film at 550° C. (in air, rate of temperature increase 6° C./min.) was 10%, thus showing that its heat stability was good.

EXAMPLES 18–24

The procedures described in Example 17 were followed and polymers composed predominantly of linear polyamides were prepared by carrying out the reactions between the diamino dicarboxylic acids and the dicarboxylic acids given in Table III, below, under the conditions given therein.

TABLE III

| Example | Diamino dicarboxylic acid/parts | Dicarboxylic acid/parts | Inorganic acid/parts | Polymerization temperature, °C./time, hrs. | Yield, percent | Resulting Polymer η_inh 30° C., H_2SO_4 0.5% | Melting point, °C. |
|---|---|---|---|---|---|---|---|
| 18 | 2,5-diamino terephthalic acid/19.6 | 3,4-dimethyl isophthalic acid/23.0 | Polyphosphoric acid/600 | 175/5 | 85 | 1.75 | Above 500. |
| 19 | 4,6-diamino isophthalic acid/19.6 | 4,4-dicarboxydiphenyl methane/26.1 | Fuming sulfuric acid/600 | 150/5 | 72 | 1.43 | Do. |
| 20 | 3,3'-benzidine dicarboxylic acid/28.6 | 4,4-dicarboxybiphenyl | Polyphosphoric acid/700 | 175/5 | 85 | 1.65 | Do. |
| 21 | Diethyl 3,3'-benzidine dicarboxylate/32.8 | 1,5-naphthalene dicarboxylic acid/22.3 | Polyphosphoric acid/460 | 165/5 | 85 | 1.95 | Do. |
| 22 | Diphenyl 2,7-diamino-3,6-naphthalene dicarboxylate/40 | Terephthalic acid/18.2 | Polyphosphoric acid/440 | 160/5 | 80 | 1.90 | Do. |
| 23 | 3,3'-benzidine dicarboxylic acid/13.6 | Isophthalic acid/9 | do | 160/5 | 85 | 1.57 | Above 540. |
| 24 | 4,6-diamino isophthalic acid/19.6 | Adipic acid/15 | Phosphorus pentoxide/600 | 160/5 | 85 | 1.62 | Above 350. |

EXAMPLE 25

A polymerization flask purged with nitrogen was charged with 44 parts of polyphosphoric acid, then heated to 80° C., following which 0.97 part of methyl terephthalate was added. The mixture was then hydrolyzed by heating to 180° C. and stirring for 30 minutes, after which 1.36 parts of benzidine dicarboxylic acid was gradually added to the mixture. The temperature was then gradually raised at normal atmospheric pressure in a stream of nitrogen, and the reaction was carried out for 5 hours at 150–160° C. The reaction liquid gradually turned to a yellowish brown, viscous liquid. The reactants were completely polymerized and the yield was as estimated. The polymer, which was obtained as a yellowish brown powder, was soluble in concentrated sulfuric acid, formic acid, dimethyl sulfoxide and dimethylacetamide. Further, it was partly soluble in dimethylformamide and trifluoroacetic acid. The polymer's melting point was above 350° C. It was confirmed by means of elemental analysis and infrared spectrum that this polymer was a linear polyamide polymer having the Formula I of Example 1. The inherent viscosity η_inh of this polymer as measured in a 0.5% solution thereof in concentrated sulfuric acid at 30° C. was 1.78. On the other hand, when measured in a 0.5% solution of the polymer in dimethyl sulfoxide at 30° C., it was η_inh=1.96. By heating this polymer I in a rotary evaporator under reduced pressure (230° C./1 mm. Hg), a polymer having a benzoxazinone ring was obtained. That this polymer has the Formula II shown in Example 1 was confirmed by means of elemental analysis and infrared spectrum. The inherent viscosity η_inh of this polymer as measured in concentrated sulfuric acid (0.5% concentration, 30° C.) was 1.03.

EXAMPLES 26–32

Following the procedures described in Example 25, linear polyamide polymers were obtained by carrying out the reactions between the diamino dicarboxylic acid components and the dicarboxylic acid esters given in Table IV under the conditions noted therein, following which the so obtained polyamide polymers were cyclized to prepare oxazinone ring-containing polymers.

TABLE IV

| Ex. | Diamino dicarboxylic acid/parts | Dicarboxylic acid ester/parts | Polymerization medium/parts | Temperature, °C./ time of ester hydrolysis, hrs. | Polymerization temperature, °C./ time, hrs. | Yield, percent | Resulting polymer $\eta_{inh}$ polyamide, 30°C., 0.5%, $H_2SO_4$ | Resulting polymer Melting point, °C. | Cyclizing reaction conditions, °C./ hrs. | Oxazinone ring-containing polymer Polybenzoxazinone $\eta_{inh}$ 30°C., 0.5%, $H_2SO_4$ |
|---|---|---|---|---|---|---|---|---|---|---|
| 26 | 2,5-diamino terephthalic acid/19.6 | Methyl 4,6-dimethyl isophthalate/22.3 | Polyphosphoric acid/600 | 170½ | 140-150/3 | 90 | 1.03 | Above 350 | ¹ 260/2 | 1.15 |
| 27 | 4,6-diamino isophthalic acid/19.6 | 4,4'-bis(methoxydicarbonyl)diphenyl methane/28.5 | do | 160/¾ | 130-145/2 | 95 | 1.85 | do | | |
| 28 | 3,3'-benzidine carboxylic acid/28.6 | 4,4'-bis(methoxycarbonyl)biphenyl/27.1 | Polyphosphoric acid/700 | 180/1½ | 140-150/5 | 98.6 | 1.67 | do | ² 300/5 | 0.85 |
| 29 | Diethyl 3,3'-benzidine dicarboxylate/32.8 | Dimethyl 1,5-naphthalene dicarboxylate/24.4 | Polyphosphoric acid/460 | 180/1 | 140-160/7 | 95 | 1.88 | do | | |
| 30 | Diphenyl 2,7-diamino-3,6-naphthalene dicarboxylate/40 | Dimethyl terephthalate/10.6, dimethyl isophthalate/10.6 | Polyphosphoric acid/600 | 200/½ | 160/5 | 90 | 1.02 | do | ² 280/1 | 1.10 |
| 31 | 3,3'-benzidine dicarboxylic acid/13.6 | Dimethyl isophthalate/10.1 | Polyphosphoric acid/440 | 190/2 | 150/5 | 98.5 | 1.92 | do | | |
| 32 | 4,6-diamino isophthalic acid/19.6 | Diethyl adipate/20.2 | Polyphosphoric acid/600 | 200/½ | 140-150/7 | 95 | 1.46 | do | | |

¹ The reaction was carried out in polyphosphoric acid.
² 1 mm. Hg.
The polybenzoxazinones of Examples 26-32 manifested no change whatsoever even when heated to 450° C.

EXAMPLE 33

Five parts of a high molecular weight polyamide obtained by the synthesis of 3,3'-benzidine dicarboxylic acid and phenyl terephthalate were placed in a 500-cc. flask and then two balls were placed therein. Using a rotary evaporator, the reactants were heated with stirring for 5 hours at 300-320° C./1 mm. Hg. The polyamide which was a yellowish brown powder at first gradually turned to a brownish blue color to yield a cyclized polymer. That the polymer structure was that of a polybenzoxazinone was confirmed by the elemental analysis values and infrared absorption spectrum. The melting point of the polymer was above 900° C. The inherent viscosity $\eta_{inh}$ in concentrated sulfuric acid (0.5% concentration, 30° C.) was 1.05.

EXAMPLE 34

1.36 parts of 3,3'-benzidine dicarboxylic acid [melting point 300° C. (decomposition)] were ground finely. A polymerization flask purged with nitrogen was charged with 60 parts of polyphosphoric acid, then heated to 80° C., after which 1.65 parts of terephthalamide was added thereto. Then, after stirring the mixture for 1 hour at 180° C., 1.36 parts of the finely divided 3,3'-benzidine dicarboxylic acid were gradually added to the mixture. The temperature was gradually raised at normal atmospheric pressure in a stream of nitrogen, and the reaction was carried out for 5 hours at 140° C. The reaction liquid gradually turned to yellowish brown, viscous liquid. The reactants were completely polymerized and the yield was as estimated. The polymer, which was obtained as a yellowish brown powder, was soluble in concentrated sulfuric acid, formic acid, dimethyl sulfoxide and dimethylacetamide. Further, it was partly soluble in dimethylformamide and trifluoroacetic acid. The polymer's melting point was above 900° C. It was confirmed by means of elemental analysis values and infrared absorption spectrum that this was a linear polyamide polymer having the Formula I of Example 1. The inherent viscosity $\eta_{inh}$ of this linear polymer as measured in a 0.5% solution thereof in concentrated sulfuric acid at 30° C. was 1.66. By heating this linear polymer for 5 hours in a rotary evaporator under reduced pressure (230° C./1 mm. Hg), a benzoxazine ring-containing polymer was obtained. It was confirmed by means of elemental analysis and infrared spectrum that this final polymer has the Formula II shown in Example 1. The inherent viscosity $\eta_{inh}$ of this final polymer as measured in concentrated sulfuric acid (0.5% concentration, 30° C.) was 1.07.

EXAMPLES 35-39

Following the procedures described in Example 34, linear polyamide polymers were obtained by carrying out the reactions between the diamino dicarboxylic acid components and diamides given in Table V, below, under the conditions shown therein, following which these polymers were cyclized to prepare oxazinone ring-containing polymers.

TABLE V

| Example | Diamino dicarboxylic acid/parts | Diamide/parts | Polymerization medium/parts | Temperature, °C./ time of diamide hydrolysis, hrs. | Polymerization temperature, °C./ time, hrs. | Linear polyamide | | | Oxazinone ring-containing polymer | |
|---|---|---|---|---|---|---|---|---|---|---|
| | | | | | | Yield, percent | $\eta_{inh}$, 30° C., 0.5% $H_2SO_4$ | Melting point, °C. | Cyclizing reaction conditions, °C./ hrs. | Polybenzoxazinone $\eta_{inh}$, 30° C., 0.5% $H_2SO_4$ |
| 35 | 2,5-diamino terephthalic acid/16.8 | 4,4'-biphenyldicarbamide/24 | Polyphosphoric acid/ 200 | 200/½ | 140-150/5 | 90 | 0.51 | Above 350 | ¹ 280/5 | 0.70 |
| 36 | 4,6-diamino isophthalic acid/16.8 | 2,6-naphthalene dicarbamide/20.4 | Polyphosphoric acid/ 300 | 180/1 | 130-140/7 | 95 | 0.65 | ...do... | ² 300/1 | 0.75 |
| 37 | 3,4'-diamino-3,4'-dicarboxydiphenyl methane/43.5 | 4,4'-isopropylidene benzamide/32 | Polyphosphoric acid/ 500 | 170-180/½ | 140-160/3 | 98.6 | 0.59 | ...do... | ³ 260/1 | 0.81 |
| 38 | Diethyl 3,3'-benzidine dicarboxylate/32.8 | Sebacamide/20.4 | ...do... | 200/1 | 160/4 | 87.5 | 0.76 | ...do... | | |
| 39 | 2,7-dicarboxy-3,6-diaminonaphthalene/24.6 | Naphthalamide | Polyphosphoric acid/ 200 | 180/½ | 150-160/3 | 91.0 | 0.88 | ...do... | | |

¹ 1 mm. Hg.
² 1 mm. Hg.
³ In polyphosphoric acid.

NOTE.—There was no change whatsoever in the polybenzoxazinone of Examples 35-39 even though they were heated to 450° C.

EXAMPLE 40

13.6 parts of 3,3'-benzidine dicarboxylic acid were dissolved in 450 parts of N-methylpyrrolidone, this solution being then placed in a polymerization vessel purged with nitrogen, after which 7.5 parts of lithium chloride were added thereto. A solution of 10.1 parts terephthaloyl chloride in 50 parts of N-methylpyrrolidone, while being cooled to −20° C., was added to the foregoing polymerization vessel. After completing the addition in 30 minutes, the reaction was carried out for 10 hours at 0° C. The reaction product was then dumped into 300 parts of methanol and the precipitate was separated by filtration. The polymer obtained (yield 88%) was a yellowish brown powder, which was soluble in concentrated sulfuric acid, formic acid, dimethyl sulfoxide, dimethylacetamide, alpha-bromonaphthalene and diphenylmethane. Further, it was partly soluble in dimethylformamide, trifluoroacetic acid, methanol and ethanol. The melting point of this polymer was above 900° C. That this polymer was a linear polyamide polymer having the Formula I of Example 1 was confirmed by means of its elemental analysis values and infrared absorption spectrum. The inherent viscosity $\eta_{inh}$ of this polyamide measured in a 0.5% solution thereof in concentrated sulfuric acid at 30° C. was 1.15. Further, its inherent viscosity $\eta_{inh}$, as measured in a 0.5% solution thereof in dimethyl sulfoxide at 30° C., was 1.26. On the other hand, the inherent viscosity of the polyamide obtained by carrying out the polymerization as hereinabove described but in the absence of the lithium chloride was 0.28.

EXAMPLE 41

272 parts of 3,3-benzidine dicarboxylic acid (melting point 300° C.) was dissolved in 300 parts of hexamethylphosphortriamide. This solution was gradually added with stirring to a solution cooled to −5° C. in a polymerization vessel, the latter solution consisting of 116 parts isophthaloyl chloride in 200 parts of cyclohexanone, to which have also been added 10 parts of lithium chloride, the addition being carried out at normal atmospheric pressure in a stream of nitrogen. After completing the addition in about 40 minutes, the reaction was carried out for 6 hours at 50-160° C. The resulting polymer was precipitated in methanol and then separated by filtration. The polymer composed predominantly of a linear polyamide was heated for 1 hour at 250-280° C. and a reduced pressure of 2-3 mm. Hg in a stream of nitrogen. The reactants were completely condensed and a crystalline polymer having a melting point of above 400° C. was obtained. In the infrared spectrum, the band of stretching vibration of amino group that are present in the monomer completely disappeared and the new band of carbonyl absorption of the benzoxazinone ring at 1760 cm.⁻¹ was confirmed.

The melting point of the polymer was above 900° C., and weight loss of 5.5% was observed at 800° C. The inherent viscosity $\eta_{inh}$, as measured in dimethylacetamide at 25° C., was 1.16.

EXAMPLES 42-48

Following the procedures described in Example 40, the diamino dicarboxylic acid components and dicarboxylic acid halogenides given in Table VI, below, were dissolved in solvents A and B, respectively, following which the two solutions were reacted under the conditions indicated in said Table VI to yield linear polyamide polymers.

TABLE VI

| Example | Diamino dicarboxylic acid/parts | Dicarboxylic acid halogenide/parts | Solvent salt/parts | Solvent/parts | Temperature, °C., time/hrs. | Polyamide Yield, percent | Polyamide Viscosity, $\eta_{inh}$ |
|---|---|---|---|---|---|---|---|
| 42 | 2,5-diamino terephthalic acid/19.6 | 3,4-dimethyl isophthaloyl chloride/23.1 | Lithium chloride/7.5 | (A) dimethyl sulfoxide/600 (B) hexane/600 | 180–185/5 | 85 | 1.46 |
| 43 | 4,6-diamino isophthalic acid/19.6 | 4,4'-bis(chlorocarbonyl)diphenylmethane/29.1 | Lithium chloride/5 | (A) N-methylpyrrolidone/600 (B) cyclohexane/600 | 165/10 | 48 | 1.38 |
| 44 | 3,3'-benzidine dicarboxylic acid/28.6 | 4,4'-bis(chlorocarbonyl)biphenyl/27.9 | Lithium bromide/10 | (A) dimethylformamide/160 (B) cyclohexane/160 | 160/10 | 65 | 1.45 |
| 45 | 3,3'-benzidine dicarboxylic acid/32.8 | 1,5-naphthalene dicarbonyl chloride/25.3 | Calcium chloride/10 | (A) dimethylacetamide/100 (B) N-methylpyrrolidone/100 | 163/10 | 80 | 1.59 |
| 46 | Diphenyl 2,7-diamino-3,6-naphthalene dicarboxylate/40 | Terephthaloyl bromide/21.2 | Lithium chloride/10 | (A) cyclohexanone/200 (B) N-methylpyrrolidone/200 | 108/10 | 75 | 1.56 |
| 47 | 3,3'-benzidine dicarboxylic acid/13.6 | 2,5-dimethyl-terephthaloyl chloride/11.6 | Lithium chloride/20 | (A) N-methylpyrrolidone/450 (B) N-methylpyrrolidone/50 | 0/22 | 88.5 | |
| 48 | 4,6-diamino isophthalic acid/19.6 | Oxalic acid dichloride/9.9 | Lithium chloride/25 | (A) N-methylpyrrolidone/600 (B) N-methylpyrrolidone/600 | 165/10 | 65 | 1.48 |

When the so obtained polyamides of Examples 42–47 were dissolved in dimethyl sulfoxide and formed into films, which were then heat treated for 1–2 hours at 300–350° C., all were converted into polybenzoxazinones which did not melt or become degraded even though heated to above 500° C.

EXAMPLE 49

One thousand parts of polyphosphoric acid were charged to a polymerization flask purged with nitrogen, then heated to 80° C., after which 11.2 parts of terephthalic acid were added thereto. After heating this mixture to 180° C. and stirring for 30 minutes, 17.2 parts of 3,3'-benzidine dicarboxylic acid hydrochloride were added gradually. Then the temperature was gradually raised at normal atmospheric pressure in a stream of nitrogen and the reaction was carried out for 5 hours at 150–160° C. The reaction liquid gradually turned to a yellowish brown, viscous liquid. The reactants were completely polymerized and the yield was as estimated. The resulting polymer, which was a yellowish brown powder, was soluble in concentrated sulfuric acid, formic acid, dimethyl sulfoxide and dimethylacetamide. Further, it was partly soluble in dimethylformamide and trifluoroacetic acid. Its melting point was above 900° C. That the polymers formed was a linear polyamide polymer having the Formula I of Example 1 was confirmed from its elemental analysis values and infrared absorption spectrum. The inherent viscosity $\eta_{inh}$ of this polymer, as measured in a 0.5% solution thereof in concentrated sulfuric acid at 30° C., was 1.98 and was much higher than the instance where free 3,3'-benzidine dicarboxylic acid had been used by the same procedures. Further, its inherent viscosity $\eta_{inh}$ in a 0.5% solution thereof in dimethyl sulfoxide at 30° C. was 2.86. By heating this polyamide I in a rotary evaporator under reduced pressure (350° C./1 mm. Hg), a polymer having a benzoxazinone ring was obtained. That the structure of this polymer was that shown by the Formula II of Example 1 was confirmed by means of its elemental analysis and infrared spectrum.

The inherent viscosity $\eta_{inh}$ of this polybenzoxazinone in concentrated sulfuric acid (0.5% concentration, 30° C.) was 2.08.

EXAMPLES 50–56

The procedures described in Example 49 were followed and linear polyamide polymers were obtained by carrying out the reactions between the diamino dicarboxylic acid hydrochlorides and dicarboxylic acid components shown in Table VII under the conditions shown therein, after which the so obtained polyamides were cyclized to yield polybenzoxazinones.

TABLE VII

| Ex. | Diamino dicarboxylic acid hydrochloride/parts | Dicarboxylic acid or derivative thereof/parts | Inorganic acid/parts | Temperature, °C./time of ester hydrolysis, hrs. | Polymerization temperature, °C./time, hrs. | Linear Polyamide Yield, percent | Linear Polyamide Melting point, °C. | Polybenzoxazinone Cyclizing condition °C. hrs. | Polybenzoxazinone $\eta_{inh}$ 30° C., 0.5% $H_2SO_4$ |
|---|---|---|---|---|---|---|---|---|---|
| 50 | 2,5-diamino terephthalic acid hydrochloride/26.7 | 4,6-dimethyl-isophthalic acid/19.5 | Polyphosphoric/200 | 170/½ | 140-150/3 | 90 | Above 350 | ¹ 260 | 2.15 |
| 51 | 4,6-diamino isophthalic acid hydrochloride/26.7 | 4,4'-bis(methoxycarbonyl) diphenylmethane/28.5 | Fuming sulfuric acid/600 | 160/¼ | 130-145/2 | 95 | do | ¹ 260 | 2.05 |
| 52 | 3,3'-benzidine dicarboxylic acid hydrochloride/35.7 | 4,4'-bis(methoxycarbonyl)biphenyl/27.9 | Polyphosphoric acid/5,000 | 180/½ | 140-150/5 | 98.6 | do | ² 300/5 | 2.85 |
| 53 | Diethyl 3,3'-bendicarboxylate hydrochloride/59.9 | Dimethyl 1,5-naphthalene dicarboxylate/24.4 | Polyphosphoric acid/3,000 | 180/1 | 140-160/7 | 95 | do | ² 300/5 | 1.95 |
| 54 | Diphenyl 2,7-diamino-3,6-naphthalene dicarboxylate hydrochloride/47.1 | {Dimethyl terephthalate/10.6; Dimethyl isophthalate/10.6} | }Polyphosphoric acid/6,000 | 200/½ | 160/5 | 90 | Above 500 | ² 280/1 | 2.10 |
| 55 | 3,3'-benzidine dicarboxylic acid hydrochloride/17.2 | Diethyl terephthalate/10 | Polyphosphoric acid/600 | 180/¼ | 160/3 | 90 | do | ² 300/3 | 2.01 |
| 56 | 4,6-diamino isophthalic acid hydrochloride/26.7 | Adipamide/11.6 | Phosphorus pentoxide/2,000 | 200/½ | 140-150/7 | 95 | do | ² 280/1 | 2.06 |

¹ In polyphosphoric acid.
² 1 mm Hg.

There was no change whatsoever in any of the polybenzoxazinones obtained in Examples 50-56 even though they were heated to 450° C.

EXAMPLE 57

13.6 parts of 3,3'-benzidine dicarboxylic acid and 8.3 parts of terephthalic acid were gradually added at 100° C. to 1000 parts of polyphosphoric acid containing in advance 1 part of lithium chloride. The mixture was then gradually heated with stirring in a stream of nitrogen, and the polymerization reaction was carried out for 3 hours at 200° C. The reactants were polymerized quantitatively and finally yielded a polymer having a melting point of above 500° C. The inherent viscosity $\eta_{inh}$ of this polymer, as measured in a 0.5% solution thereof in concentrated sulfuric acid at 30° C., was 1.98. From the infrared spectrum and elemental analysis, it is believed that this polymer is a mixture of a polymer in which an oxazinone ring has been formed and a prepolymer prior to it cyclization.

A film was formed from a dimethyl sulfoxide solution of this polymer. By heating this film for 3 hours at 300° C./1 mm. Hg in a stream of nitrogen, it was converted to a tough, heat-resistant film. Even though this film was heated to 500° C., hardly any changes such as dissolution or decomposition took place.

EXAMPLES 58-64

Following the procedures described in Example 57, the reactions between the diamino dicarboxylic acid components and dicarboxylic acid derivatives given in Table VIII, below, were carried out in the presence of halides of either alkali or alkaline earth metals and polyphosphoric acid under the conditions shown in said Table VIII to prepare linear polyamides. These were then heated at 300-350° C. under reduced pressure to yield polybenzoxazinones.

TABLE VIII

| Ex. | Diamino dicarboxylic acid/parts | Dicarboxylic acid derivative/parts | Inorganic salt/parts | Polymerization medium/parts | Polymerization temperature, °C./time, hrs. | Linear polymer, yield percent | Polybenzoxazinone $\eta_{inh}$ 30° C., 0.5% $H_2SO_4$ | Polybenzoxazinone Melting point, °C. |
|---|---|---|---|---|---|---|---|---|
| 58 | 2,5-diamino terephthalic acid/19.6 | 3,4-dimethyl isophthaloyl chloride/23.1 | Lithium chloride/1.5 | Polyphosphoric acid/1,600 | 175/5 | 80 | 1.89 | Above 500. |
| 59 | 4,6-diamino isophthalic acid/19.6 | 4,4'-dicarbamoyl diphenylmethane/25.3 | Lithium bromide/1 | Fuming sulfuric acid/1,000 | 150/5 | 75 | 1.75 | Do. |
| 60 | 3,3'-benzidine dicarboxylic acid/28.3 | 4,4'-dicarboxybiphenyl/25.6 | Calcium chloride/10 | Polyphosphoric acid/1,000 | 175/5 | 88.6 | 1.60 | Do. |
| 61 | Diethyl 3,3'-benzidine dicarboxylate/32.8 | 1,5-naphthalene dicarboxylic acid/21.6 | Lithium chloride/0.1 | Polyphosphoric acid/500 | 165/5 | 85 | 1.96 | Do. |
| 62 | Diphenyl 2,7-diamino-3,6-naphthalene dicarboxylate/40 | Diphenyl terephthalate/31.8 | Lithium chloride/1 | Fuming sulfuric acid/800 | 160/5 | 80 | 2.02 | Do. |
| 63 | 3,3'-benzidine dicarboxylic acid/13.6 | Isophthaloyl chloride/10.1 | do | Polyphosphoric acid/1,000 | 160/2 | 88.5 | 1.86 | Do. |
| 64 | 4,6-diamino isophthalic acid/19.6 | Adipamide/11.6 | Lithium chloride/4.5 | Polyphosphoric acid/600 | 160/5 | 85 | 1.78 | Above 350. |

EXAMPLE 65

34.8 parts of 3,3'-benzidine dicarboxylic acid hydrochloride (melting point 300° C.) were dissolved in 300 parts of hexamethylphosphortriamide. This solution was gradually added with stirring at normal atmospheric pressure in a stream of nitrogen to a solution in a polymerization vessel cooled to −5° C., the latter solution consisting of 116 parts of isophthaloyl chloride in 200 parts of cyclohexane which also contained 10 parts of lithium chloride. After completing the addition in about 40 minutes, a solution of 10 cc. of pyridine in 10 cc. of N-methylpyrrolidone was added gradually, and then the polymerization reaction was carried out for 6 hours at 50-160° C. The polymer formed was precipitated in methanol and then separated by filtration. The resulting polymer was then heated in a stream of nitrogen for 1 hour at a polymerization temperature of 250-280° C. and a reduced pressure of 2-3 mm. Hg. The reactants were completely condensed and a crystalline polymer having a melting point above 400° C. was obtained. In the infrared spectrum, the N—H stretching vibration of primary amino group which are present in the monomer disappeared completely and the new carbonyl absorption band of the benzoxazinone ring at 1760 cm.$^{-1}$ was confirmed.

The melting point of this final polymer was above 900° C. and at 800° C. there was observed a weight loss of 1%. The inherent viscosity $\eta_{inh}$, as measured in dimethylacetamide at 25° C., was 1.86.

EXAMPLES 66–72

The hydrochlorides of the various diamino carboxylic acid and the dicarboxylic acid halogenides given in Table IX, below, were dissolved in solvents A and B, respectively, after which the reactions between the two solutions were carried out under the conditions given in said Table IX, in the presence of the salts of either alkali or alkaline earth metals, whereby were prepared the corresponding polyamides.

TABLE IX

| Ex. | Diamino carboxylic acid hydrochloride/parts | Dicarboxylic acid halogenide/parts | Solvent salt/parts | Solvent/parts | Temperature, °C./ time, hrs. | Polyamide Yield, percent | Polyamide Viscosity |
|---|---|---|---|---|---|---|---|
| 66 | 2,5-diamino terephthalic acid hydrochloride/26.8 | 3,4-dimethyl isophthaloyl chloride/23.1 | Lithium chloride 7.5 | (A) dimethyl sulfoxide/600 <br> (B) hexane/600 | 180–185/5 | 85 | 1.68 |
| 67 | 4,6-diamino isophthalic acid hydrochloride/26.8 | 4,4'-bis(chlorocarbonyl)diphenylmethane/29.1 | Lithium chloride/5 | (A) N-methylpyrrolidone/600 <br> (B) cyclohexane/600 | 165/10 | 48 | 2.35 |
| 68 | 3,3'-benzidine carboxylic acid hydrochloride/34.8 | 4,4'-bis(chlorocarbonyl)biphenyl/27.9 | Lithium bromide/10 | (A) dimethylformamide/160 <br> (B) cyclohexanone/160 | 160/10 | 65 | 1.95 |
| 69 | Diethyl 3,3'-benzidine carboxylic acid hydrochloride/40 | 1,5-naphthalene dicarbonyl chloride/25.3 | Calcium chloride/10 | (A) dimethylacetamide/100 <br> (B) N-methylpyrrolidone/100 | 163/10 | 80 | 1.69 |
| 70 | Diphenyl 2,7-diamino-3,6-naphthalene dicarboxylate hydrochloride/41 | Terephthaloyl bromide/21.2 | Lithium chloride/10 | (A) N-methylpyrrolidone/200 <br> (B) cyclohexanone/200 | 168 | 75 | 1.58 |
| 71 | 3,3'-benzidine dicarboxylic acid hydrochloride/17.4 | 2,5-dimethyl terephthaloyl chloride/11.6 | Lithium chloride/20 | (A) N-methylpyrrolidone/450 <br> (B) N-methylpyrrolidone/50 | 0/22 | 70 | 1.66 |
| 72 | 4,6-diamino isophthalic acid hydrochloride/26.8 | Adipic acid dichloride/18.3 | Lithium chloride/25 | (A) N-methylpyrrolidone/600 <br> (B) N-methylpyrrolidone/600 | 165/10 | 65 | 1.40 |

When the so obtained polyamides were dissolved in dimethyl sulfoxide, then formed into films which were heat treated for 1–2 hours at 300–350° C., they were all converted to polybenzoxazinones, which did not melt or deteriorate even when heated to above 500° C.

EXAMPLE 73

13.6 parts of thoroughly purified, white 3,3'-benzindine dicarboxylic acid were dried and before using were dissolved in 50 cc. of dimethylacetamide and 10 g. of pyridine with a blender. 13.6 parts isophthaloyl chloride were dissolved in 20 cc. of cyclohexanone, and then since the reaction is exothermic, the solution was added gradually while cooling with water. The temperature rose to about 40° C. By cooling with ice, the temperature was maintained at room temperature. In the meantime, stirring was continued with the stirring speed of the blender at its maximum. The stirring was stopped when no further change in the viscosity of the solution was observed. In about 1–2 hours it became uniform. When this solution was allowed to stand in a desiccator at room temperature, a gradual increase in its viscosity was noted. When this viscous, light brown solution was poured into methanol or water, with stirring, a light yellow polymer separated out. The inherent viscosity $\eta_{inh}$ of this polymer, as measured in dimethylacetamide at 30° C., was 1.25. This polymer dissolved well in such organic solvents as dimethylacetamide, dimethylformamide and dimethylsulfoxide. Further, it dissolved well in aqueous solutions of concentrated sulfuric acid and alkalis, and when an aqueous alkali solution of it was acidified, the polymer was immediately deposited. From its infrared spectrum, it was found that this polymer was a polyamide having the following recurring units.

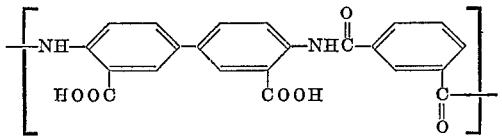

When 3 g. of this polyamide was dipped for 2 hours at room temperature in 50 cc. of an acetic anhydride/isoquinoline (3:1) solution and thereafter dried at 100° C., a polybenzoxazinone was obtained which did not melt or deteriorate even when heated to 500° C.

EXAMPLE 74

While dissolving 0.03 mol of thoroughly purified 2,2'-bis(3-amino-4-carboxyphenyl)propane in 50 cc. of dimethyl sulfoxide and 10 cc. of triethylamine, a dimethylacetamide solution of 0.03 mol of acid chloride of 3,3'-dicarboxydiphenyl ether was gradually added. After stirring for 15 hours at room temperature, the reaction solution was poured into methyl alcohol to separate the polymer, which was then washed with water and methanol and thereafter dried in a 100° C. reduced pressure dryer. The polymer so obtained dissolved well in the solvents such as named in Example 72. Its inherent viscosity $\eta_{inh}$, as measured in dimethylacetamide at 30° C., was 1.35. The film obtained from dimethyl sulfoxide was dipped in a benzoic anhydride/pyridine mixture and then dried for 2 hours at 140° C. There could hardly be observed a change in its strength, but it having a dehydrated and cyclized benzoxazinone ring, and neither an amide bond nor a carboxyl radical being detected in its infrared spectrum, it was converted to a polymer which did not dissolve in an aqueous alkali solution. It however dissolved well in concentrated sulfuric acid. On the other hand, when the film of the aforesaid polyamide was heated for 1 hour at 200° C. and reduced pressure, no changes were seen in its infrared spectrum. When the heating was carried out for another 30 minutes at 250° C., it could be seen that the dehydration and cyclization started to take place from the fact that there was a broad absorption in the neighborhood of 2900 cm.$^{-1}$ (NH) and an increase in the absorption in the neighborhood of 1760 cm.$^{-1}$ (ester carbonyl). When heated further for 30 minutes at 330° C., the absorptions of 3300 cm.$^{-1}$ and 1650 cm.$^{-1}$ disappeared completely, and it could be seen by comparison with the model compound that the benzoxazinone ring had been formed. This film however tended to be inferior in the appearance of its surface than that described hereinbefore. The infrared spectra of the films formed from these cyclized polymers showed no change even when heated for 30 minutes at 370° C., 480° C. or 530° C. the polymer having the dehydrated and cyclized benzoxazinone ring, which became insoluble in aqueous alkali solutions and organic solvents, dissolved well in concentrated sulfuric acid only.

EXAMPLES 75–85

Polyamide films obtained from the monomeric components shown in Table X, below, were treated with acid anhydrides under the conditions shown in said Table X to yield polybenzoxazinone films which did not melt or become deteriorated at all even when heated to 350° C.

allowed to stand 48 hours, no gelling occurred whatsoever. When this composition was formed into a film by flowing a part of it onto a plate glass, a transparent brown film having flexibility was obtained. When this film was subjected to a cyclizing reaction by (1) heating it for 5 hours at 280° C./1 mm. Hg and (2) treating it chemically with acetic anhydride/pyridine, a heat-resistant, high molecular weight polybenzoxazinone in film form was readily obtained.

EXAMPLE 87

17.4 parts of thoroughly purified, white 3,3'-benzidine dicarboxylic acid hydrochloride were dissolved in a blender in 500 cc. of dimethylacetamide distilled prior to using and 10 parts of pyridine. To this was added a solution of 13.6 parts of isophthaloyl chloride in 20 cc. of cyclohexanone, this solution being gradually added while being cooled with water to ensure that the temperature does not rise too much, since this reaction is exothermic. The temperature rose to about 40° C. Cooling externally with ice, the solution was held in the neighborhood of room temperature. During the meantime, the

TABLE X

| Example: | Monomeric Components | | Polyamide viscosity, inh. (25° C., $H_2SO_4$, 0.5%) | Treating Agents | Dipping temperature, ° C./time, hrs. | Drying temperature, ° C./time, hrs. |
|---|---|---|---|---|---|---|
| 75 | BDC | TPCl | 1.58 | AA/P (3:1) | 20/2 | 100/2 |
| 76 | BDC | TPCl | 1.12 | AA/P/benzene (3:1:5) | 60/5 | 130/2 |
| 77 | BDC | TPA | 2.05 | AA/P (hereinafter in accordance with above) | 60/2 | 140/2 |
| 78 | BDC | TPA | 1.84 | BA/TEA/acetonitrile | 80/2 | 140/2 |
| 79 | BDC·HCl | TPN | 0.85 | AA/TBO | 25/2 | 125/2 |
| 80 | BDC·HCl | TPN | 0.94 | AA/P/cyclohexane | 25/2 | 125/2 |
| 81 | BDC·HCl | DMT | 0.40 | BA/TEA/carbon tetrachloride | 25/2 | 100/2 |
| 82 | BDC·HCl | DMT | 0.58 | AA/P/benzene | 25/2 | 100/2 |
| 83 | BDC | I.PCl | 1.45 | AA/P/ethyl acetate | 45/2 | 100/2 |
| 84 | BDC | I.PCl | 1.05 | AA/P | 20/2 | 125/2 |
| 85 | BDC | TPCl | 1.91 | AA/TEA/chloroform | 20/2 | 145/2 |

In the above table:
BDC=3,3'-benzidine dicarboxylic acid.
BDC·HCl=3,3'-benzidine dicarboxylic acid hydrochloride.
TPCl=terephthaloyl chloride.
TPA=terephthalic acid.
TPN=terephthalonitrile.
DMT=dimethyl terephthalate.
I.PCl=isophthaloyl chloride.
AA=acetic anhydride.
BA=benzoic anhydride.
P=pyridine.
TEA=triethylamine.
TBO=sodium-tert-butoxide.

EXAMPLE 86

1.36 parts of 3,3'-benzidine dicarboxylic acid were ground finely. A polymerization flask purged with nitrogen was charged with 44 parts of polyphosphoric acid, which was heated to 80° C. first before adding thereto 1.1 parts of terephthaloyl chloride. Then the 1.36 parts of 3,3'-benzidine dicarboxylic acid were added to this gradually. After gradually raising the temperature at normal atmospheric pressure in a stream of nitrogen, the reaction was carried out for 1 hour at 140° C. and then for 1 hour at 150–160° C. The reaction liquid gradually turned to a yellowish brown, viscous liquid. This reaction liquid was poured into 500 ml. of water and then filtered. The resulting yellow solid [$\eta_{inh}$=1.66 (25° C., 0.5% H$_2$SO$_4$)] was introduced into 3% sodium carbonate aqueous solution and filtered. When this solid was washed with water and in its still water-containing swelled state was introduced into 100 cc. of dimethyl sulfoxide containing 0.001 part of benzaldehyde, it dissolved very readily at room temperature. Then, for forming a film, it was heated while passing nitrogen over it to evaporate the water contained in the reaction mixture as an azeotropic mixture with the organic solvent. When the heating and stirring was stopped at the stage at which the water content had been completely eliminated, a polyamide composition was obtained which contained 20 parts of organic solvent per part of the polyamide. This polyamide composition was very stable in that even though it was stirring was continued with the stirring speed of the blender at its maximum. In about 1–2 hours the solution viscosity became nearly uniform. When this solution was allowed to stand in a desiccator at room temperature, a gradual increase in its viscosity was noted. When this viscous, light brown solution was poured into water with stirring, a light yellow polymer separated. The inherent viscosity $\eta_{inh}$ of this polymer in dimethyl sulfoxide at 30° C. was 1.25. This water-containing swelled polyamide was given an alkali treatment by introducing it into 10% sodium bicarbonate aqueous solution. The alkali-treated polyamide was a hydrate of 15–20 times water content which, when eliminated of its water content by introducing it into 100 parts of dimethyl sulfoxide containing 0.01 part of formic acid and heating and concentrating to a monomer concentration of 20–30% while blowing in an inert gas, yielded a stable polyamide solution. This solution not only could be maintained stable over a long period of time but also since the low polymers had been eliminated from it, it was very excellent as a film-forming solution. On the other hand, in the case of the polymer which had been introduced into water after its polymerization, although an attempt was made to dissolve this polymer in organic solvents after completely eliminating its water content, it was, in general, difficult to obtain a satisfactory solution even though the stirring was carried out for an extended period.

EXAMPLE 88

17.2 parts of purified 3,3'-benzidine dicarboxylic acid and 15.6 parts of biphenyl ether-4,4'-dicarbonyl chloride were dissolved in 130 parts of N-methylpyrrolidone and polycondensed to obtain 28 parts of a polyamide having an inherent viscosity of 1.56 ($H_2SO_4$, 25° C., 0.5%). The resulting polymeric solution was introduced into 200 parts of 5% sodium carbonate aqueous solution, and the deposited polymer was thoroughly washed. The so obtained water-containing swelled polymer was dissolved at room temperature in 300 parts of N-methylpyrrolidone/hexamethylphosformide (1:1) mixed solvent, to which was added 0.005 part of monochloroacetic acid as a viscosity stabilizer. The water content of the mixed solvent was completely distilled off by heating the polymeric solution to 100–120° C. while blowing in nitrogen as the inert gas for 5 hours. The so obtained polyamide solution had such a stability as to make it suitable for processing into fibers or films.

EXAMPLE 89

13.6 parts of 3,3'-benzidine-dicarboxylic acid were dissolved in 50 parts of 8% aqueous sodium hydroxide (solution A). 10.2 parts of terephthaloyl chloride were dissolved in 50 parts of chloroform, to which solution was added 0.5 part of sodium lacerate (solution B). Solution B was cooled at 0° C. in a dry nitrogen atmosphere and to this solution was slowly added solution A within 30 minutes with mechanical stirring. The mixed solution was stirred at 0° C. for 10 hours, and the resulting solution was poured into 300 parts of distilled water. The precipitated polymer was washed thoroughly with water and chloroform (95% yield), and dried. The resulting polymer is soluble in concentrated sulfuric acid, formic acid, dimethylformamide, dimethylacetamide, α-bromonaphthalene and diphenylmethane. The polymer's melting point was above 350° C., and the following linear aromatic polyamide structure was confirmed by elemental analysis and infrared spectra,

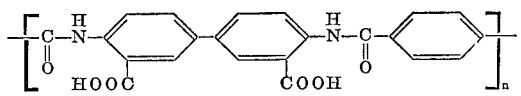

The inherent viscosity of the polymer measured in concentrated sulfuric acid at 25° C. at 0.5% concentration was 1.86.

The resulting polyamide acid was heated at 300–320° C./1 mm. Hg. to form polybenzoxazinone by thermal dehydration. The structure of polybenzoxazinone was established by elemental analysis and infrared spectra as mentioned below and the polymer's melting point was found to be 540–550° C. $\eta_{inh}$=1.85 (conc. $H_2SO_4$, 0.5%, 25° C.).

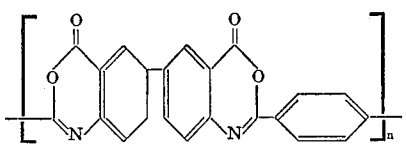

We claim:
1. A linear film and fiber-forming polyamide consisting of a structure of the formula

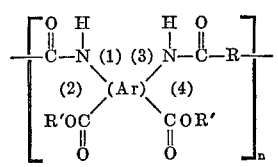

wherein (Ar) is a tetravalent aromatic radical having at least 6 carbon atoms and selected from the group consisting of the radicals

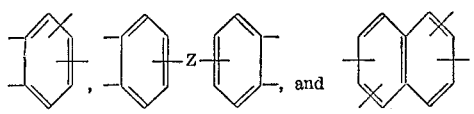

wherein Z is a divalent radical selected from the group consisting of a carbon-carbon bond directly connecting the benzene rings,

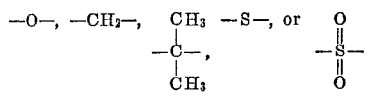

R is an aliphatic or aromatic divalent radical selected from the group consisting of

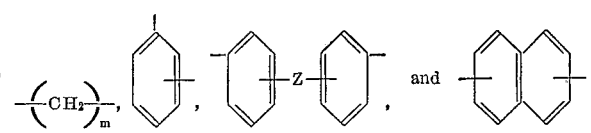

wherein m is an integer of 0 to 10 and Z is as defined above, R' is a monovalent radical selected from the group consisting of hydrogen, alkyl radicals of 1 to 6 carbon atoms and a phenyl radical, the bonds (1) and (2), similarly as with bonds (3) and (4), being directly bonded to carbon atoms adjoining each other on the aromatic radical, and n is an integer sufficiently great enough that the inherent viscosity measured in a 0.5% solution of the polymer in concentrated sulfuric acid at 30° C. becomes at least 0.1.

2. A polymer of claim 1 wherein said R is an arylene radical having 6 to 15 carbon atoms.

3. A polymer of claim 1 wherein said Ar is represented by the formula

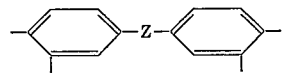

wherein Z is a divalent radical selected from the group consisting of a carbon-carbon bond directly connecting the benzene rings,

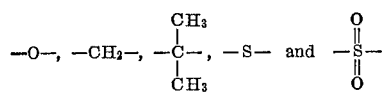

radicals.

4. A composition capable of being molded, said composition comprising the polymer of claim 1 dissolved in a solvent therefor.

5. A composition of claim 4 in which is incorporated further a viscosity stabilizer selected from the group consisting of aliphatic carboxylic acids of 1 to 3 carbon atoms, benzene aldehydes and phenols.

6. A film and fiber-forming oxazinone ring-containing polymer consisting of a structure of the formula

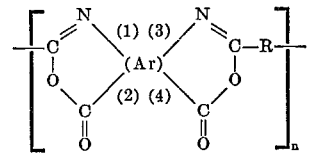

wherein (Ar) is a tetravalent aromatic radical having at least 6 carbon atoms and selected from the group consisting of the radicals

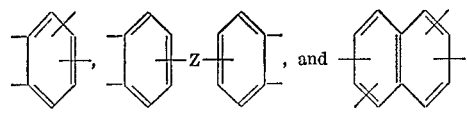

wherein Z is a divalent radical selected from the group consisting of a carbon-carbon bond directly connecting the benzene rings,

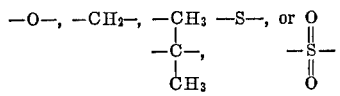

R is an aliphatic or aromatic divalent radical selected from the group consisting of

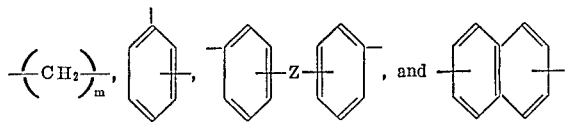

wherein $m$ is an integer of 0 to 10 and Z is as defined above, the bonds (1) and (2), similarly as with the bonds (3) and (4), being directly bonded to carbon atoms adjoining each other on the aromatic radical, and $n$ is an integer sufficiently great enough that the inherent viscosity measured in a 0.5% solution of the polymer in concentrated sulfuric acid at 30° C. becomes at least 0.1.

7. A polymer of claim 6 wherein said R is an arylene radical having 6 to 15 carbon atoms.

8. A polymer of claim 6 wherein said Ar is represented by the formula

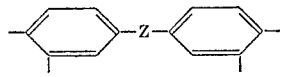

wherein Z is a divalent radical selected from the group consisting of a carbon-carbon bond directly connecting the benzene rings,

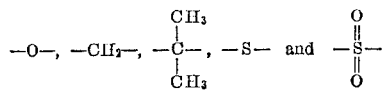

radicals.

9. A method of preparing an oxazinone ring-containing polymer which comprises heating to a temperature of at least 200° C. a polyamide consisting of the structure of the formula

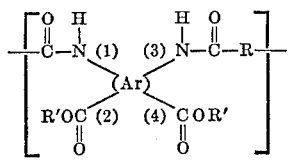

wherein (Ar) is a tetravalent aromatic radical having at least 6 carbon atoms and selected from the group consisting of the radicals

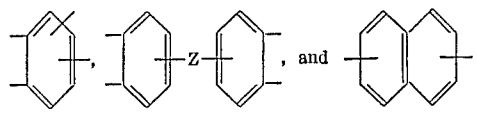

wherein Z is a divalent radical selected from the group consisting of a carbon-carbon bond directly connecting the benzene rings,

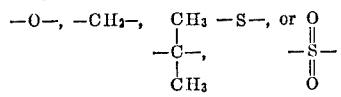

R is an aliphatic or aromatic divalent radical selected from the group consisting of

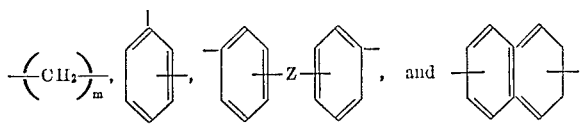

wherein $m$ is an integer of 0 to 10 and Z is as defined above, R' is a monovalent radical selected from the group consisting of hydrogen, alkyl radicals of 1 to 6 carbon atoms and a phenyl radical, the bonds (1) and (2), similarly as with bonds (3) and (4), being directly bonded to carbon atoms adjoining each other on the aromatic radical, and $n$ is an integer sufficiently great enough that the inherent viscosity measured in a 0.5% solution of the polymer in concentrated sulfuric acid at 30° C. becomes at least 0.1, to effect the intermolecular cyclization by the elimination of the R'OH from said polyamide to yield the oxazinone-containing polymer consisting of a structure of the formula

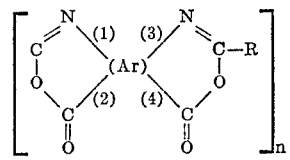

wherein (Ar), R and $n$ have the meanings as hereinabove defined.

10. A method of preparing an oxazinone-containing polymer which comprises treating a polyamide consisting of the structure

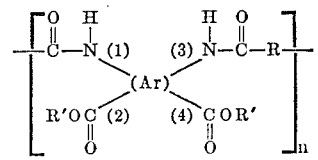

wherein (Ar) is a tetravalent aromatic radical having at least 6 carbon atoms and selected from the group consisting of the radicals

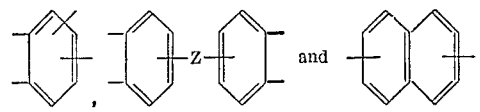

wherein Z is a divalent radical selected from the group consisting of a carbon-carbon bond directly connecting the benzene rings,

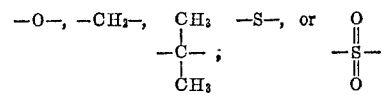

R is an aliphatic or aromatic divalent radical selected from the group consisting of

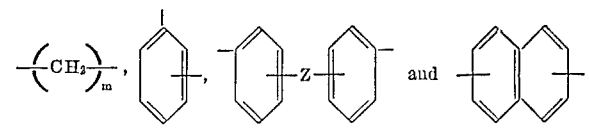

wherein $m$ is an integer of 0 to 10 and Z is as defined above, R' is a monovalent radical selected from the group consisting of hydrogen, alkyl radicals of 1 to 6 carbon atoms and a phenyl radical, the bonds (1) and (2), similarly as with bonds (3) and (4), being directly bonded to carbon atoms adjoining each other on the aromatic radical, and $n$ is an integer sufficiently great enough that the inherent viscosity measured in a 0.5% solution of the polymer is concentrated sulfuric acid at 30° C. becomes at least 0.1, with a substantially anhydrous basic organic solution containing a carboxylic acid anhydride to effect the intermolecular cyclization by the elimination of the R'OH from said polyamide to yield the oxazinone-containing polymer consisting of a structure of the formula

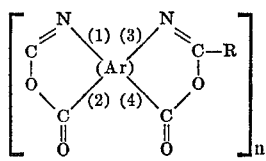

wherein (Ar), R and $n$ have the meanings as hereinabove defined.

11. The method of claim 9 wherein said heating is effected in a non-oxidizing atmosphere.

12. The method of claim 9 wherein said heating is effected at a reduced pressure of 10 mm. Hg.

References Cited

UNITED STATES PATENTS

| 3,094,511 | 6/1963 | Hill et al. | 260—78 |
| 3,386,965 | 6/1968 | Huffman et al. | 260—78 |

WILLIAM H. SHORT, Primary Examiner

L. L. LEE, Assistant Examiner

U.S. Cl. X.R.

117—161; 260—2.5, 30.2, 30.6, 30.8, 32.6, 45.7, 45.85, 45.95, 47, 49, 78.4

UNITED STATES PATENT OFFICE
CERTIFICATE OF CORRECTION

Patent No. 3,468,851                                    September 23, 1969

Naoya Yoda et al.

It is certified that error appears in the above identified patent and that said Letters Patent are hereby corrected as shown below:

Column 4, line 7, "form" should read -- from --; lines 17 and 18, "chlorcarbonylphenyl" should read -- chlorocarbonylphenyl --; lines 44 and 45, "phosphosphortriamide" should read -- phosphortriamide --. Column 6, line 34, before "obtained" insert -- be --. Column 7, line 5, "not" should read -- no --; lines 16 and 17, "dehydrate" should read -- dehydrating --; line 17, "0.0" should read -- 0.1 --. Column 8, line 5, "than" should read -- then --; formula I, that portion reading "C" should read $$-- \overset{\overset{\|}{C}}{\underset{O}{\|}} --.$$

Column 11, line 5, "tempearture" should read -- temperature --. Column 12, line 15, "solfoxide" should read -- sulfoxide --. Columns 19 and 20, Example 57, first column, line 2, "aded" should read -- added --. Column 21, TABLE IX, opposite Ex. 72, second column, "hydorchloride" should read -- hydrochloride --.

Signed and sealed this 24th day of November 1970.

(SEAL)
Attest:

EDWARD M. FLETCHER, JR.                    WILLIAM E. SCHUYLER, JR.
Attesting Officer                          Commissioner of Patents